United States Patent

Bauer

[11] 4,045,008
[45] Aug. 30, 1977

[54] GAS SPRING

[75] Inventor: Fritz Bauer, Altdorf, Germany

[73] Assignee: Suspa Federungstechnik Fritz Bauer & Sohne OHG, Nurnberg, Germany

[21] Appl. No.: 676,627

[22] Filed: Apr. 13, 1976

[30] Foreign Application Priority Data

Apr. 15, 1975 Germany .............................. 2516478

[51] Int. Cl.² ................................................ F16F 9/02
[52] U.S. Cl. .................................... 267/120; 267/65 R
[58] Field of Search ................... 267/8 R, 64 R, 65 R, 267/69–74, 113, 118, 120, 124; 16/51, 52, 66; 188/282, 284, 300, 316; 248/354 H, 400

[56] References Cited

U.S. PATENT DOCUMENTS

| 2,071,701 | 2/1937 | Mejean | 267/8 R X |
| 2,616,687 | 11/1952 | Butterfield | 267/64 R |
| 3,147,966 | 9/1964 | Axthammer et al. | 267/64 R |
| 3,559,776 | 2/1971 | Schultze | 188/300 X |
| 3,825,244 | 7/1974 | Bauer | 267/124 |
| 3,937,450 | 2/1976 | Bauer | 267/113 |
| 3,963,225 | 6/1976 | Nicholls | 267/65 R |
| 3,963,227 | 6/1976 | Molders | 267/120 |

Primary Examiner—Johnny D. Cherry
Attorney, Agent, or Firm—Browdy and Neimark

[57] ABSTRACT

A gas spring, particularly adapted as a lifting means for hatch backs or trunk lids of motor vehicles, comprises a piston rod acting as a displacement piston, a housing cylinder containing a compressed gas, a guide piston near one end of the piston rod and in slidable relationship with the interior of the cylinder housing, characterized in that the piston rod is provided with an extension projecting beyond the guide piston, the closed end of the cylinder housing having a complementary receptacle for the piston rod extension, whereby when the piston rod is fully retracted into the cylinder housing, the extension enters the complementary space in the housing in a sealing manner, a valve being provided to permit the escape of fluid from the space as the extension passes thereinto, whereby the force acting to extend the piston rod is reduced to zero or nearly zero in the vicinity of the fully retracted position of the piston rod.

6 Claims, 3 Drawing Figures

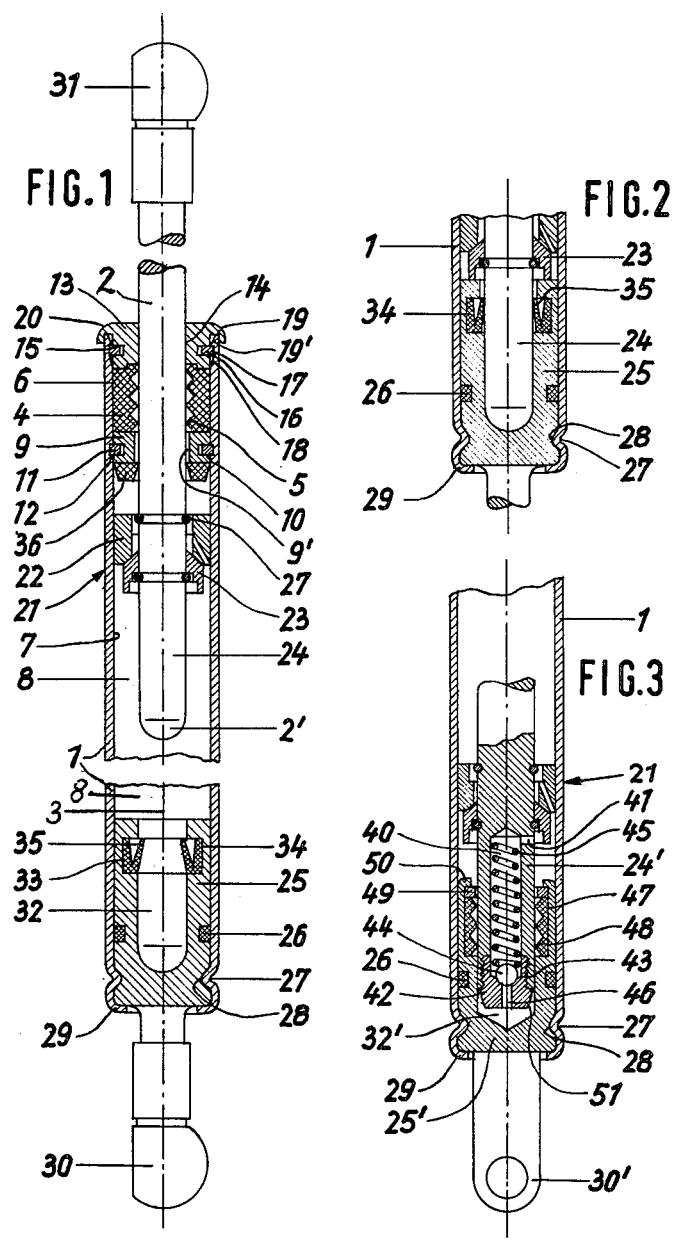

GAS SPRING

The invention relates to a gas spring, consisting of a housing made from a cylindrical tube and closed at one end, the chamber inside said housing being filled with compressed gas, and further consisting of a piston rod displaceably mounted coaxially in said housing, said piston rod bearing a guide piston and extending in a sealed manner from the other end of the housing, said piston rod acting as a displacement piston.

Gas springs of this type are widely used as lifting means for hatchbacks or truck lids of motor vehicles. The gas spring or gas springs are mounted so that the piston rod is pushed into the housing when the hatchback or trunk lid is closed. Hence, the maximum extending force acting on the piston rod exists when the hatchback or truck lid is closed. In order to prevent excessive torsion from being imposed on the hatchback or trunk, which is a very light design in any case, especially in the normal operating condition, in other words with the trunk lid or hatchback closed, two gas springs are usually provided, said springs being mounted symmetrically relative to the central lengthwise axis of the trunk lid or hatchback, so that the trunk lid or hatchback is not lifted by the rubber bumpers located between the trunk lid or hatchback on the one hand and the car body on the other.

German Auslegeschrift 1 812 282 teaches a lifting device for height adjustment of chair seats, table tops and the like, in which a lengthwise adjustment of the piston rod relative to the housing is made possible by means of a valve. In this case, the guide piston is made in the form of a closed, guided plate, sealed off from the inside wall of the housing. The two chambers thus created inside the housing can be connected with one another by means of an annular channel surrounding the housing which forms an inner cylinder by interposing a valve which can be operated at will from outside, said valve being located in the otherwise closed end of the lifting means. A lifting means of this type cannot be considered for use as a lifting means for the hatchbacks or trunk lids of motor vehicles because of its design which is too expensive for this purpose. In addition, special operating means would have to be provided for actuating the valve.

U.S. Pat. No. 3,963,225 teaches a gas spring of the type described hereinabove, whose piston rod is provided with an extension which extends in the direction of the closed end of the housing, and which is provided at the closed end of the housing with a cylindrical cross section having a reduced internal diameter, into which the extension penetrates in a sealing manner when the piston approaches its limit of travel. An additional gas spring is formed thereby, since the gas located in the cylindrical section is compressed when the extension enters the latter. These measures therefore serve to make the characteristic curve of this gas spring steeper in the vicinity of the fully retracted end position of the piston rod than in the remainder of its travel.

The goal of the invention is to design a gas spring of the type described hereinabove in such manner that the force acting to extend the piston rod can be reduced to zero in the vicinity of the fully retracted position of the piston rod.

This goal is achieved according to the invention by the fact that the piston rod is provided with an extension which extends beyond the guide piston into the closed end of the housing, by the fact that a space is provided in the area of the closed end of the housing, into which the extension fits in a sealing manner when the piston rod approaches its fully retracted end position, and by the fact that valve means are provided which connect the space with the chamber, i.e. the valve opens, when the extension enters the space and the valve closes when the extension moves out of the space.

The measures according to the invention ensure that when the extension enters the space, in other words, when the piston rod approaches its fully retracted end position, the space is separated from the rest of the chamber by means of the seal and the compressed gas in the space is forced out through the valve means into the chamber. After the piston rod has been extended slightly from its end position, naturally without the piston rod moving out of the space, the pressure of the residual gas remaining in the remaining space drops suddenly, i.e., the extending force acting on the piston rod decreases. Depending on the dimensioning of the extension, the extending force acting on the piston rod in this end position can be reduced to zero. In order to accomplish this the cross section of the extension must be at least equal to the cross section of the piston rod, resulting in an increase in the forces which are formed by the atmospheric pressure acting from the outside on the piston rod and the pressure of the residual gas in the space on the extension.

The space and the extension which enters the latter have practically no effect upon changing the characteristics of the gas spring when it is retracted, since the pressure in this space when the retracting process is complete is always roughly equal to the pressure in the rest of the chamber. The pressure difference which develops is just great enough for the valve means to open as the extension slides into the space. If the valve means are sufficiently sensitive, an extremely small pressure difference will suffice.

In order to achieve the effect produced by the means according to the invention, even when the gas spring is filled exclusively with gas, if possible precisely when the piston rod is in its retracted end position, i.e., in order to reduce the resilience of the piston rod to the greatest extent until this effect is attained, it is advantageous if the extension largely fills the space with its outer circumferential area, with the piston rod retracted to its end position. This results in the so-called "dead space", which still contains residual gas, being reduced to a minimum. In an extreme case, this dead space can be practically reduced to zero.

On the other hand, if the gas spring is filled even with a small amount of oil, which serves for lubrication and sealing, and also serves as a shock absorber, and especially if the gas spring is installed so that this small amount of oil filling is located in the space, the piston rod will not rebound by even a small amount. This involves filling the remaining space not occupied by the extension with incompressible oil, i.e., immediately after the extension enters the space, all force exerted on the piston rod is relieved.

In a particularly simple embodiment of the gas spring according to the invention, the valve means is formed by a lip valve, whose sealing lip rests against the extension and points toward the chamber. When the extension slides into the space, the gas and/or oil can flow from the space between the sealing lip and the extension into the chamber. When the pressure on the piston rod in its fully retracted end position is relieved, i.e., when the pressure drop occurs in the remaining space, no gas and/or oil can flow back from the chamber into the space, since the sealing lip is pressed firmly by the gas pressure against the extension, forming a seal. This lip seal therefore performs the function of a check valve in the form of a lip valve.

In another advantageous embodiment of the gas spring according to the invention, the valve means is formed by a check valve which is mounted in a channel which connects the space with the chamber, said valve opening into the chamber against the gas pressure. A check valve of this type is usually in the form of a valve ball, made of rubber for example, pressed against a valve seat by a spring. It is particularly advantageous from the manufacturing technology standpoint if this check valve is located in the extension.

If the design of the gas spring according to the invention is such that the extending force acting on the retracted piston rod when the latter is in the end position is zero, a force which is no greater than the cross section of the piston rod multiplied by the atmospheric pressure will suffice to release the gas spring, i.e., to pull the piston rod out into a position in which the extension comes free of the seal. Since the cross section of the piston rod is usually less that 1 cm² in gas springs of this type, this force required for its release is negligibly small. If it is desired to have the force required for releasing the piston rod be greater than the force described above, this can be achieved by making the cross-sectional area of the extension larger than the cross-sectional area of the piston rod.

Further advantages and features of the invention will be seen from the description of three embodiments with reference to the drawings.

FIG. 1 shows a gas spring according to the invention.

FIG. 2 shows the area of the closed end of the gas spring shown in FIG. 1, with the piston rod in the fully retracted position.

FIG. 3 shows the area of the closed end of a gas spring which is modified in this area.

Figure 4:
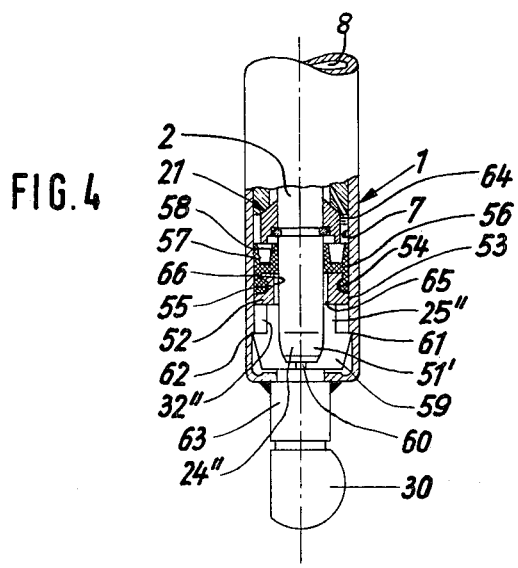
FIG. 4 shows the area of the closed end of an additional gas spring modified in this area.

The gas springs shown in the drawings consist of a circularly cylindrical housing 1, which is long relative to its diameter, and is therefore slender, said housing being made from a drawn steel tube. A piston rod 2 is mounted coaxially in housing 1 and acts as a compression piston, said rod likewise having a circularly cylindrical cross section. The axis of piston rod 2 therefore coincides with axis 3 of housing 1. Housing 1 is sealed at the end (the upper end in FIG. 1) at which piston rod 2 emerges from housing 1 by means of a known multi-lip seal 4, whose lips 5 rest against the absolutely smooth surface of piston rod 2. Lip seals 4 likewise form a seal with its outer circumference 6 against inside wall 7 of housing 1, so that this seal, which is merely designed homogeneously and is not reinforced, forms an absolutely tight seal for housing 1 at the end from which the piston rod emerges. At the end which is directed toward chamber 8 of housing 1, lip seal 4, whose length is approximately equal to its outside diameter, is firmly fastened by means of a holding element 9 in the shape of a cylindrical ring axially in the direction of chamber 8 of the housing. This holding element 9 is also provided with a radially recessed groove 10, in the form of an annular channel, which has its outside circumference resting against inside wall 7 of housing 1, with a snap ring 11, in other words an elastically deformable ring, located in said recess 10. A corresponding annular channel 12, likewise radially recessed, is provided in the inside wall 7 of housing 1, with snap ring 11 fitting into said annular channel 12. The lengths of recess 10 and annular channel 12 in the direction of the housing axis are equal and sufficiently large that snap ring 11 has practically no axial play in recess 10 or annular channel 12, so that holding element 9 is held in housing 1 axially with absolutely zero play. The radial depth of the recess 10 which is in the form of an annular channel is at least as large as the width of snap ring 11, so that the latter can lie completely inside recess 10 when holding element 9 is slid into housing 1 with elastic deformation, and will enter the annular channel under elastic expansion when recess 10 and annular channel 12 separate radially, thereby producing a permanent connection between holding element 9 and housing 1 at this point. The diameter of bore 9' of holding element 9 is slightly larger than the diameter of piston rod 2, so that the latter will not fit into holding element 9.

In the embodiment, seal 4 is attached axially at its end facing outward by a guide element 13 which is likewise in the shape of a cylindrical ring. This guide element 13 has its inner bore 14 firmly against piston rod 2, so that piston rod 2 is guided radially in this guide element 13, thus preventing any dirt entering from outside into seal 4. It consists of a thermoplastic, i.e., elastic plastic with good sliding properties relative to steel. Guide element 13 is attached in theoretically the same manner as holding element 9 axially in housing 1. A recess 15 in the form of an annular channel is provided on the cylindrical outside circumference of guide element 13, the radial depth of said recess being at least equal to the width of a snap ring 16 located in recess 15, said ring being located axially in the recess, likewise with practically zero play. Snap ring 16 fits into an annular channel 17 in the inside wall 7 of the housing. This annular channel 17 differs from annular channel 12 by the fact that its side wall, facing chamber 8 of housing 1, tapers in the manner of a truncated cone from the bottom of the annular channel outward, thus forming a sloping surface 18.

The inside wall 7 of the housing is provided with a bevel 19' on edge 19, said bevel becoming wider toward the edge. Housing 1 is not plastically deformed over its length for the entire area of the seal, i.e., it has a completely rectilinear cylindrical outside surface on the outside. Guide element 13 is designed so that it fits over the edge 19 of housing 1 with a projection 20, thus forming a clean and smooth seal for the gas spring at this end.

The axial distance between holding element 9 and guide element 13 is such that seal 4 is pressed together to a desired extent in the axial direction, so that it is pressed by virtue of its elastic properties radially with a desired tension on the one hand against the inside wall 7 of housing 1 and on the other hand with its lips 5 against piston rod 2. Seal 4 consists of an elastic material, preferably polyurethane, known by the registered trademark of "Vulkollan".

An annular shock absorber 36 made of rubber is provided at the free end of holding element 9, said shock absorber serving to prevent a hard impact of displacement piston 22 against holding element 9 when piston rod 2 is extended.

A guide piston 21 is mounted on the inner part of piston rod 2, said guide piston consisting essentially of a sliding piston 22 and a valve body 23.

The design of the gas spring, to the extent that it has been described thus far, and especially the design and manner of operation of guide piston 21, are shown and described in U.S. Pat. application Ser. No. 528,690 now U.S. Pat. No. 3,937,450.

An extension 24 of piston rod 2 extends beyond guide piston 21, said extension 24 likewise having a circularly cylindrical cross section. At its free end, this extension is provided for example with an approximately hemispherical end 21.

In the vicinity of the end of the gas spring opposite seal 4, an approximately cylindrical fitting 25 is provided in housing 1, the outside circumference of said fitting being sealed relative to inside wall 7 of the housing by means of an annular seal 26. This element 25 is protected against axial displacement relative to housing 1 by means of a crease 27, which is pressed into a corresponding annular channel 28 in the outside circumference of element 25. In addition, the outside edge 29 of housing 1 is turned over the outer end of element 25.

A connecting element 30 or 31 of arbitrary design is fastened to element 25 in the same manner as at the free end of piston rod 2, and said connecting element can be a connecting element with a shape which is a segment of a sphere.

A bore is provided in element 25, said bore likewise running coaxially to axis 3 and therefore coaxially with extension 24, said bore forming a space 32. The cross section and length of this space 32 correspond to the cross section and shape of extension 24, wherein the diameter of space 32 is only sufficiently larger to the extent that tolerance is required for allowing extension 24 to enter. In the area contiguous with chamber 8 of housing 1 an annular channel 33 is provided in the bore which forms space 32, said annular channel 33 having a lip seal 34 located therein in such a manner that its inner sealing lip 35 points toward chamber 8.

When extension 24 enters space 32 by virtue of piston rod 2 being retracted into housing 1 to its end position, as shown in FIG. 2, sealing lip 35 fits tightly against the cylindrical wall of extension 24, so that as extension 24 slides into space 32, the compressed gas located in the latter can escape through the narrow annular gap between the outside wall of the cylindrical extension 24 and the inside wall of space 32 into chamber 8. It is impossible for the gas to flow back into space 32 since sealing lip 35 is pressed in a gas-tight manner against extension 24 by the gas pressure prevailing in space 8. As is obvious from FIG. 2, when piston rod 2 is completely retracted into housing 1, i.e., when extension 24 has traveled completely into space 32, space 32 is completely filled by extension 24, so that there is practically no gas left in the space. The tapered extension 2' makes it easier for extension 24 to fit into lip seal 34.

The embodiment shown in FIG. 3 differs from those in FIGS. 1 and 2 only in the design of extension 24' and element 25'. Inasmuch as the same parts are used, the same reference numbers are used.

Extension 24' is provided with a coaxial bore 40, which communicates at the end which faces chamber 8 via a radial bore 41 even when element 25' of chamber 32' is completely filled by extension 24'. A valve seat part 42 is screwed into the free end of extension 24', and a valve ball 44 is held in a sealing manner against the inner valve seal surface 43 by means of a soft compression spring 45 in such manner that valve bore 46 is normally closed. A recess 47 in the form of an annular channel is provided in the inside wall of the bore which forms space 32', a multi-lip seal 48 being located in said recess 47 and said multi-lip seal theoretically being of the same design as multi-lip seal 4. This multi-lip seal is held firmly in place axially by means of a ring 49 and a bead 50, so that a pretensioning of this multi-lip seal 48 can be accomplished by turning over bead 50.

Extension 24' is likewise provided in the area of its free end with a taper 51 in order to ensure smooth sliding of extension 24' into mulit-lip seal 48.

A connecting element 30' is attached to the outer end of element 25', said connecting element being made in the form of an eye in this case.

The embodiment according to FIG. 4 differs from those shown in FIGS. 1 and 2 once again only in the design of extension 24" and element 25". To the extent that identical parts are used, the same reference numbers are used. Extension 24" is formed by an extension of piston rod 2 and is provided at its free end with a taper 51'. Element 25" consists of a part, injection molded from hard elastic plastic, said part being made in the form of a closed holding ring 52 resting against chamber 8, and said holding ring being mounted in a centering manner by an annular bead 53 against inside wall 7 of housing 1. The holding ring is provided with a groove 54 on the outside, with a correspondingly shaped step 55 of a lip seal 56 being held in said groove in such manner that no axial displacement of this lip seal 56 relative to element 25" is possible. Lip seal 56 is provided with two sealing lips 57 and 58 directed toward chamber 8 of housing 1, wherein outer sealing lip 57 forms a seal against inside wall 7 of housing 1, while inner sealing lip 58 rests against extension 24" when piston rod 2 is pushed sufficiently far into housing 1 that the two come in contact.

Below holding ring 52, the holding element is divided by several slots 59 extending lengthwise and radially. In addition, element 25" is provided with a concentric bore or opening 60 at its end opposite chamber 8. As can be seen from FIG. 4, element 25" is provided in the area of slots 59 with projecting lugs 61, which fit into corresponding undercuts 62 in the inside wall 7 of housing 1 and thereby protect element 25" and therefore lip seal 56 against axial displacement into chamber 8 of the housing. Slots 59 and opening 60 allow radial compression of this part of element 25", so that it is possible to install this element 25" in housing 1 by sliding it in from the side where seal 4 is located. Housing 1 is closed at this end by turning over the edge, whereby the soldering on of a pin 63 for a connecting element 30 forms a gas-tight seal at the same time.

This gas spring, in addition to containing gas at high pressure, is also filled with a small amount of oil, whose level is indicated by reference number 64.

When piston rod 2 approaches the vicinity of its fully retracted end position, i.e., when taper 51' enters inner sealing lip 58 of lip seal 56, gas is first squeezed out of space 32" into chamber 8. As extension 24" advances further, the latter comes into an area of space 32" in which there is only oil. This oil is forced through slots 59 and channel 65 connected therewith into inner bore 66 which serves to guide extension 24", said inner bore being associated with holding ring 52 for lip seal 56, whereby the oil is then pressed between the inner sealing lip 58 and extension 24" into chamber 8. In this version therefore the force required to extend the piston rod in the vicinity of its end position can be reduced over a longer retraction distance or can be reduced to zero, with the distance depending on how far extension 24" can be pushed beyond sealing lip 58 to the closed end.

Figure 5:
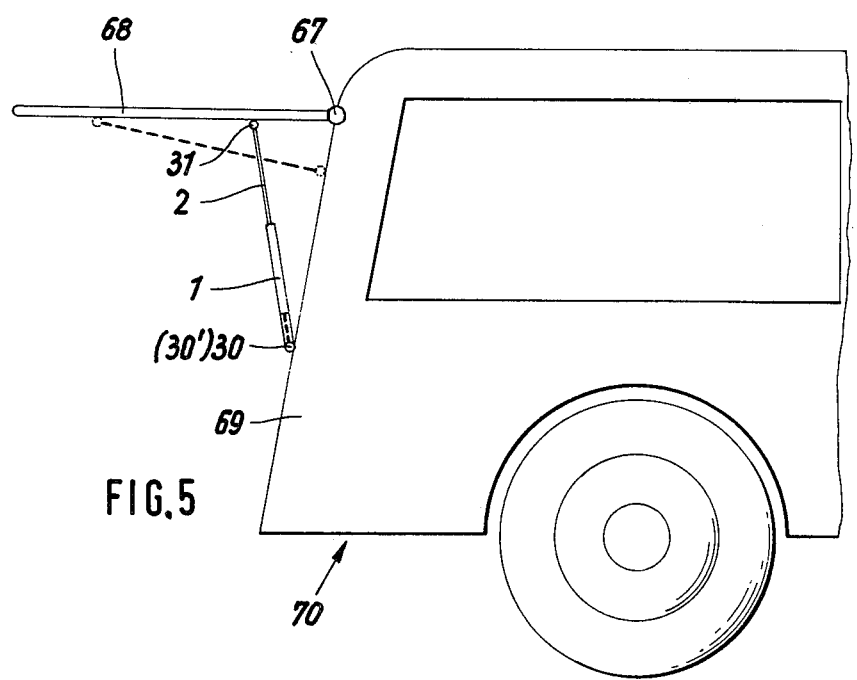
FIG. 5 shows a gas spring according to the invention mounted between the hatchback and body of a motor vehicle, in a schematic representation.

The use of one of the gas springs according to the invention as a lifting means for the hatchback of an automobile is shown in FIG. 5. Here in known manner the connecting element 31 of piston rod 2 is mounted on a hatchback 68 which is swivelable about a horizontal swivel axis 67, while the other connecting element 30 or 30' is attached to the body 69 of automobile 70. The gas pressure in chamber 8 of the gas spring is sufficiently high that after hatchback 68 is swung out slightly from the lower, closed position, thereby pulling extension 24 or 24' or 24" out of space 32 or 32' or 32" with a slight expenditure of energy, the gas spring raises the hatchback 68 to its upper position. In the lower, closed position of hatchback 68, there is practically no extending force exerted upon piston rod 2 and therefore upon hatchback 68. Alternately, the gas spring can be installed as shown by the dotted lines.

I claim:

1. In a gas spring comprising a housing formed from a sealed cylindrical tube having an internal chamber filled with compressed gas, and a piston rod mounted coaxially displaceably in said chamber, said piston rod supporting a guide piston and emerging in a sealed manner from an end of the housing and acting as a compression piston, the improvement wherein said piston rod is provided with an extension projecting beyond the guide piston, said housing having a space provided in the vicinity of the end of said housing opposite the end through which the piston rod emerges, into which space the extension enters in a sealing manner when the piston rod approaches its fully retracted end position, and means to reduce the pressure of residual gas within said space to zero or close to zero when said piston rod is in its substantially fully retracted position, said means comprising valve means connecting said space with said chamber to open as said extension enters said space and to close when the extension begins to emerge from the space.

2. Gas spring according to claim 1 wherein said valve means is formed by a lip valve having a sealing lip, said sealing lip resting on said extension and being directed toward the housing chamber.

3. Gas spring according to claim 1, wherein said valve means is formed by a check valve which is mounted in a channel which connects said space with said chamber, said check valve opening against the pressure in the housing chamber.

4. Gas spring according to claim 3, wherein said check valve is provided in said extension.

5. Gas spring according to claim 1, wherein said extension largely fills said space with its volume when said piston rod is pushed into its end position.

6. Gas spring according to claim 1, further comprising a small amount of oil in said space.

* * * * *